United States Patent
Islam et al.

(10) Patent No.: US 10,897,780 B2
(45) Date of Patent: Jan. 19, 2021

(54) RANDOM ACCESS CHANNEL (RACH) TIMING ADJUSTMENT

(71) Applicant: QUALCOMM Incorporated, San Diego, CA (US)

(72) Inventors: Muhammad Nazmul Islam, Edison, NJ (US); Sundar Subramanian, Bridgewater, NJ (US); Junyi Li, Chester, NJ (US); Tao Luo, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/708,585

(22) Filed: Sep. 19, 2017

(65) Prior Publication Data
US 2018/0176958 A1  Jun. 21, 2018

Related U.S. Application Data

(60) Provisional application No. 62/446,767, filed on Jan. 16, 2017, provisional application No. 62/436,150, filed on Dec. 19, 2016.

(51) Int. Cl.
*H04W 74/08* (2009.01)
*H04W 56/00* (2009.01)
(Continued)

(52) U.S. Cl.
CPC ....... *H04W 74/0833* (2013.01); *H04L 5/0048* (2013.01); *H04W 56/00* (2013.01);
(Continued)

(58) Field of Classification Search
CPC .. H04B 7/0617; H04B 7/0626; H04B 7/0695; H04W 52/0229; H04W 52/0255;
(Continued)

(56) References Cited

U.S. PATENT DOCUMENTS 9,240,871 B2  1/2016  Walton et al.
9,538,456 B2  1/2017  Yi et al.
(Continued)

OTHER PUBLICATIONS

"LG Electronics: "Consideration on RACH Procedure in NR", 3GPP Draft; R1-1609267 Consideration on RACH Procedure in NR, 3rd Generation Partnership Project (3GPP), Mobile Competence Centre; 650, Route Des Lucioles; F-06921, Sophia-Antipolis Cedex; France, vol. RAN WG1, Lisbon, Portugal; Oct. 10, 2016-Oct. 14, 2016 Oct. 9, 2016 (Oct. 9, 2016), XP051149313, 5 pages, Retrieved from the Internet: URL: http://www.3gpp.org/ftp/Meetings_3GPP_SYNC/RAN1/Docs/ [retrieved on Oct. 9, 2016].".
(Continued)

*Primary Examiner* — George Eng
*Assistant Examiner* — Hung K Du
(74) *Attorney, Agent, or Firm* — Patterson & Sheridan, LLP

(57) ABSTRACT

Certain aspects of the present disclosure provide techniques for random access channel (RACH) communication. For example, certain aspects provide a method for wireless communication by a user-equipment (UE). The method generally includes transmitting a first message comprising a RACH preamble, receiving a second message comprising random access response (RAR) in response to the RACH preamble, transmitting a third message in response to the RAR, receiving a fourth message (MSG4) comprising a contention resolution message in response to the third message. In certain aspects, the fourth message may include a timing advance (TA) parameter which may be used to communicate one or more messages.

24 Claims, 17 Drawing Sheets

(51) Int. Cl.
  *H04L 5/00*    (2006.01)
  *H04W 72/04*   (2009.01)
  *H04W 88/08*   (2009.01)
  *H04W 88/02*   (2009.01)

(52) U.S. Cl.
  CPC .......... *H04W 72/046* (2013.01); *H04W 88/02* (2013.01); *H04W 88/08* (2013.01)

(58) Field of Classification Search
  CPC . H04W 24/10; H04W 16/28; H04W 74/0833; H04W 72/046; H04W 88/02; H04W 88/08; H04W 56/00; H04L 5/0048
  See application file for complete search history.

(56) References Cited

U.S. PATENT DOCUMENTS

| | | | |
|---|---|---|---|
| 9,603,165 | B2 | 3/2017 | Furuskog et al. |
| 2009/0111445 | A1 | 4/2009 | Ratasuk et al. |
| 2012/0127930 | A1 | 5/2012 | Nguyen et al. |
| 2014/0119334 | A1* | 5/2014 | Kazmi ................. H04W 24/10 370/330 |
| 2014/0198742 | A1* | 7/2014 | Baldemair ........ H04W 74/0833 370/329 |
| 2015/0244432 | A1* | 8/2015 | Wang ................... H04B 7/0695 375/267 |
| 2017/0331670 | A1* | 11/2017 | Parkvall ............... H04J 11/0079 |
| 2018/0212659 | A1* | 7/2018 | Xiong ................ H04W 72/046 |

OTHER PUBLICATIONS

International Search Report and Written Opinion—PCT/US2017/065623—ISA/EPO—dated Feb. 27, 2018.
Samsung: "Random Access Procedure in NR", 3GPP Draft, R2-167568, Random Access Procedure in NR, 3rd Generation Partnership Project (3GPP), Mobile Competence Centre; 650, Route Des Lucioles; F-06921 Sophia-Antipolis Cedex, France, vol. RAN WG2, Reno. USA; Nov. 14, 2016-Nov. 18, 2016, Nov. 13, 2016 (Nov. 13, 2016), XP051177436, Retrieved from the Internet: URL: http://www.3gpp.org/ftp/Meetings_3GPP_SYNC/RAN2/Docs/ [retrieved on Nov. 13, 2016].

\* cited by examiner

RANDOM ACCESS CHANNEL (RACH) TIMING ADJUSTMENT

CROSS-REFERENCE TO RELATED APPLICATIONS

This application claims benefit of priority to provisional application No. 62/436,150, filed Dec. 19, 2016, and provisional application No. 62/446,767, filed Jan. 16, 2017, which are expressly incorporated herein by reference in their entirety.

INTRODUCTION

Aspects of the present disclosure relate to wireless communications, and more particularly, random access channel (RACH) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication. The method generally includes transmitting a first message comprising a random access channel (RACH) preamble, receiving a second message comprising random access response (RAR) in response to the RACH preamble, transmitting a third message in response to the RAR, receiving a fourth message comprising a contention resolution message in response to the third message, wherein the fourth message comprises a timing advance (TA) parameter, and communicating one or more messages based on the TA parameter.

Certain aspects of the present disclosure provide a method for wireless communication. The method generally includes receiving a first message comprising a RACH preamble, transmitting a second message comprising RAR in response to the RACH preamble, receiving a third message in response to the RAR, transmitting a fourth message comprising a contention resolution message in response to the third message, wherein the fourth message comprises a TA parameter, and communicating one or more messages based on the TA parameter.

Certain aspects of the present disclosure provide a method for wireless communication. The method generally includes transmitting a first message comprising a RACH preamble, receiving a second message comprising RAR in response to the RACH preamble, transmitting a third message in response to the RAR, receiving a fourth message comprising a contention resolution message in response to the third message, wherein the fourth message comprises an index associated with a beam, and communicating one or more messages based on the index.

Certain aspects of the present disclosure provide a method for wireless communication. The method generally includes receiving a first message comprising a RACH preamble, transmitting a second message comprising RAR in response to the RACH preamble, receiving a third message in response to the RAR, transmitting a fourth message comprising a contention resolution message in response to the third message, wherein the fourth message comprises an index associated with a beam, and communicating one or more messages based on the index.

Certain aspects of the present disclosure provide an apparatus for wireless communication. The apparatus generally includes at least one antenna, and a processing system. The processing system may be configured to transmit, via the at least one antenna, a first message comprising a RACH preamble; receive, via the at least one antenna, a second message comprising RAR in response to the RACH preamble; transmit, via the at least one antenna, a third message in response to the RAR; receive, via the at least one antenna, a fourth message comprising a contention resolution message in response to the third message, wherein the fourth message comprises a TA parameter; and communicate one or more messages based on the TA parameter.

Certain aspects of the present disclosure provide an apparatus for wireless communication. The apparatus generally includes at least one antenna, and a processing system. The processing system may be configured to receive, via the at least one antenna, a first message comprising a RACH preamble; transmit, via the at least one antenna, a second message comprising RAR in response to the RACH preamble; receive, via the at least one antenna, a third message in response to the RAR; transmit, via the at least one antenna, a fourth message comprising a contention resolution message in response to the third message, wherein the fourth message comprises a TA parameter; and communicate, via the at least one antenna, one or more messages based on the TA parameter.

Certain aspects of the present disclosure provide an apparatus for wireless communication. The apparatus generally includes at least one antenna, and a processing system. The processing system may be configured to transmit, via the at least one antenna, a first message comprising a RACH preamble; receive, via the at least one antenna, a second message comprising RAR in response to the RACH preamble; transmit, via the at least one antenna, a third message in response to the RAR; receive, via the at least one antenna, a fourth message comprising a contention resolution message in response to the third message, wherein the fourth message comprises an index associated with a beam; and communicate, via the at least one antenna, one or more messages based on the index.

Certain aspects of the present disclosure provide an apparatus for wireless communication. The apparatus generally includes at least one antenna, and a processing system. The processing system may be configured to receive, via the at least one antenna, a first message comprising a RACH preamble; transmit, via the at least one antenna, a second message comprising RAR in response to the RACH preamble; receive, via the at least one antenna, a third message in response to the RAR; transmit, via the at least one antenna, a fourth message comprising a contention resolution message in response to the third message, wherein the fourth message comprises an index associated with a beam; and communicate, via the at least one antenna, one or more messages based on the index.

Certain aspects of the present disclosure provide an apparatus for wireless communication. The apparatus generally includes means for transmitting a first message comprising a RACH preamble, means for receiving a second message comprising RAR in response to the RACH preamble, means for transmitting a third message in response to the RAR, means for receiving a fourth message comprising a contention resolution message in response to the third message, wherein the fourth message comprises a TA parameter, and means for communicating one or more messages based on the TA parameter.

Certain aspects of the present disclosure provide an apparatus for wireless communication. The apparatus generally includes means for receiving a first message comprising a RACH preamble, means for transmitting a second message comprising RAR in response to the RACH preamble, means for receiving a third message in response to the RAR, means for transmitting a fourth message comprising a contention resolution message in response to the third message, wherein the fourth message comprises a TA parameter, and means for communicating one or more messages based on the TA parameter.

Certain aspects of the present disclosure provide an apparatus for wireless communication. The apparatus generally includes means for transmitting a first message comprising a RACH preamble, means for receiving a second message comprising RAR in response to the RACH preamble, means for transmitting a third message in response to the RAR, means for receiving a fourth message comprising a contention resolution message in response to the third message, wherein the fourth message comprises an index associated with a beam, and means for communicating one or more messages based on the index.

Certain aspects of the present disclosure provide an apparatus for wireless communication. The apparatus generally includes means for receiving a first message comprising a RACH preamble, means for transmitting a second message comprising RAR in response to the RACH preamble, means for receiving a third message in response to the RAR, means for transmitting a fourth message comprising a contention resolution message in response to the third message, wherein the fourth message comprises an index associated with a beam, and means for communicating one or more messages based on the index.

Certain aspects of the present disclosure provide a computer-readable medium having instructions stored thereon for transmitting a first message comprising a RACH preamble, receiving a second message comprising RAR in response to the RACH preamble, transmitting a third message in response to the RAR, receiving a fourth message comprising a contention resolution message in response to the third message, wherein the fourth message comprises a TA parameter, and communicating one or more messages based on the TA parameter.

Certain aspects of the present disclosure provide a computer-readable medium having instructions stored thereon for receiving a first message comprising a RACH preamble, transmitting a second message comprising RAR in response to the RACH preamble, receiving a third message in response to the RAR, transmitting a fourth message comprising a contention resolution message in response to the third message, wherein the fourth message comprises a TA parameter, and communicating one or more messages based on the TA parameter.

Certain aspects of the present disclosure provide a computer-readable medium having instructions stored thereon for transmitting a first message comprising a RACH preamble, receiving a second message comprising RAR in response to the RACH preamble, transmitting a third message in response to the RAR, receiving a fourth message comprising a contention resolution message in response to the third message, wherein the fourth message comprises an index associated with a beam, and communicating one or more messages based on the index.

Certain aspects of the present disclosure provide a computer-readable medium having instructions stored thereon for receiving a first message comprising a RACH preamble, transmitting a second message comprising RAR in response to the RACH preamble, receiving a third message in response to the RAR, transmitting a fourth message comprising a contention resolution message in response to the third message, wherein the fourth message comprises an index associated with a beam, and communicating one or more messages based on the index.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
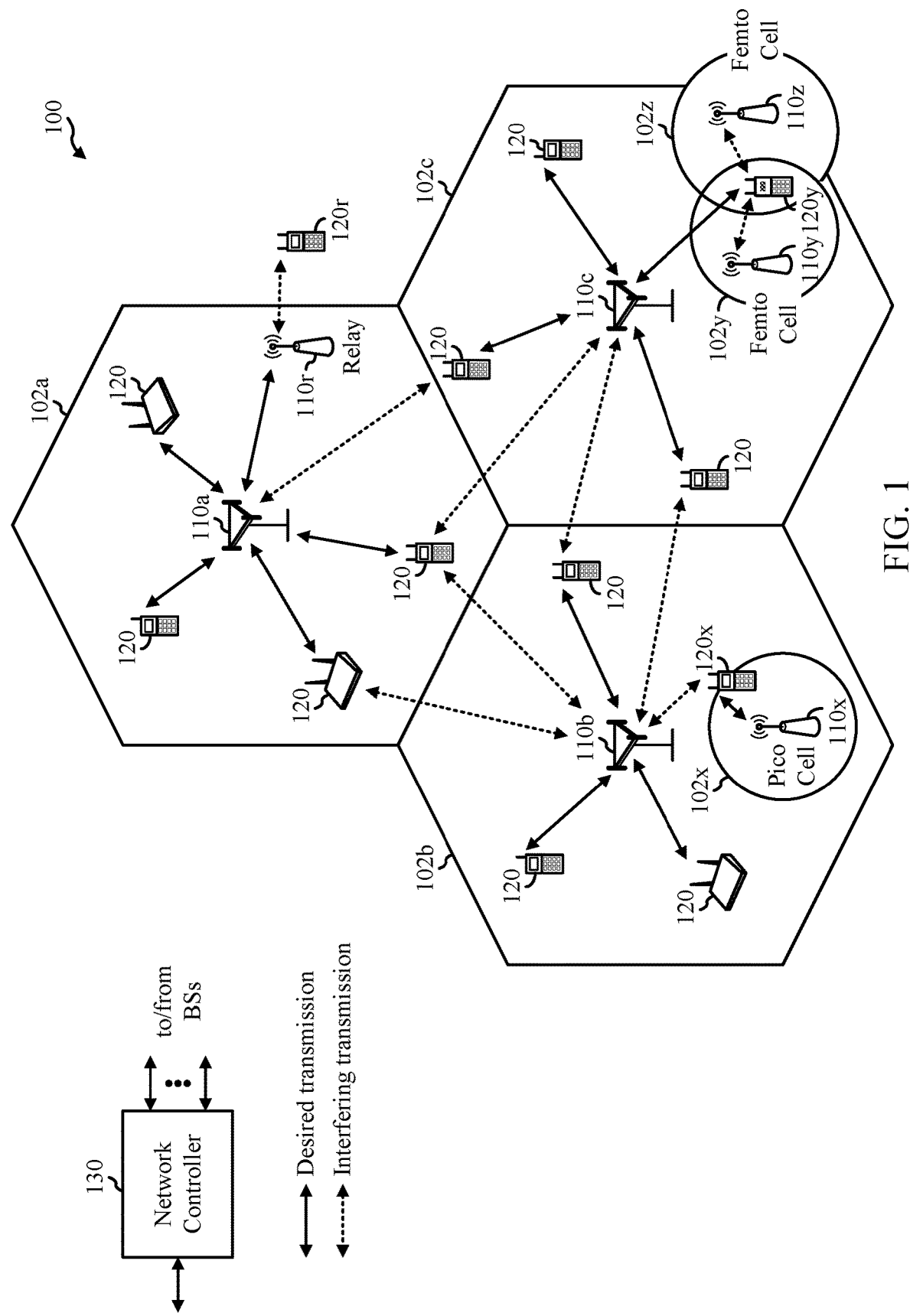
FIG. 1 is a block diagram conceptually illustrating an example telecommunications system, in accordance with certain aspects of the present disclosure.

Aspects of the present disclosure provide apparatus, methods, processing systems, and computer readable mediums for random access channel (RACH) communication.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

FIG. 1 illustrates an example wireless network 100 in which aspects of the present disclosure may be performed. For example, the wireless network may be a new radio (NR) or 5G network. NR wireless communication systems may employ beams, where a base station (BS) and a user-equipment (UE) communicate via active beams. As described herein, a BS may monitor active beams using measurements of reference signals (e.g., MRS, CSI-RS, synch) transmitted via reference beams.

UEs 120 may be configured to perform the operations 1300 and methods described herein for detecting a mobility events based, at least in part, on mobility parameters associated with a beam set. BS 110 may comprise a transmission reception point (TRP), Node B (NB), 5G NB, access point (AP), new radio (NR) BS, etc. BS 110 may be configured to perform the operations 1400 and methods described herein for configuring beam sets and mobility parameters associated with each of the beam sets. The BS may receive an indication of a detected mobility event based on the mobility parameters and may make a decision regarding mobility management of the UE based on the event trigger.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using time division duplexing (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
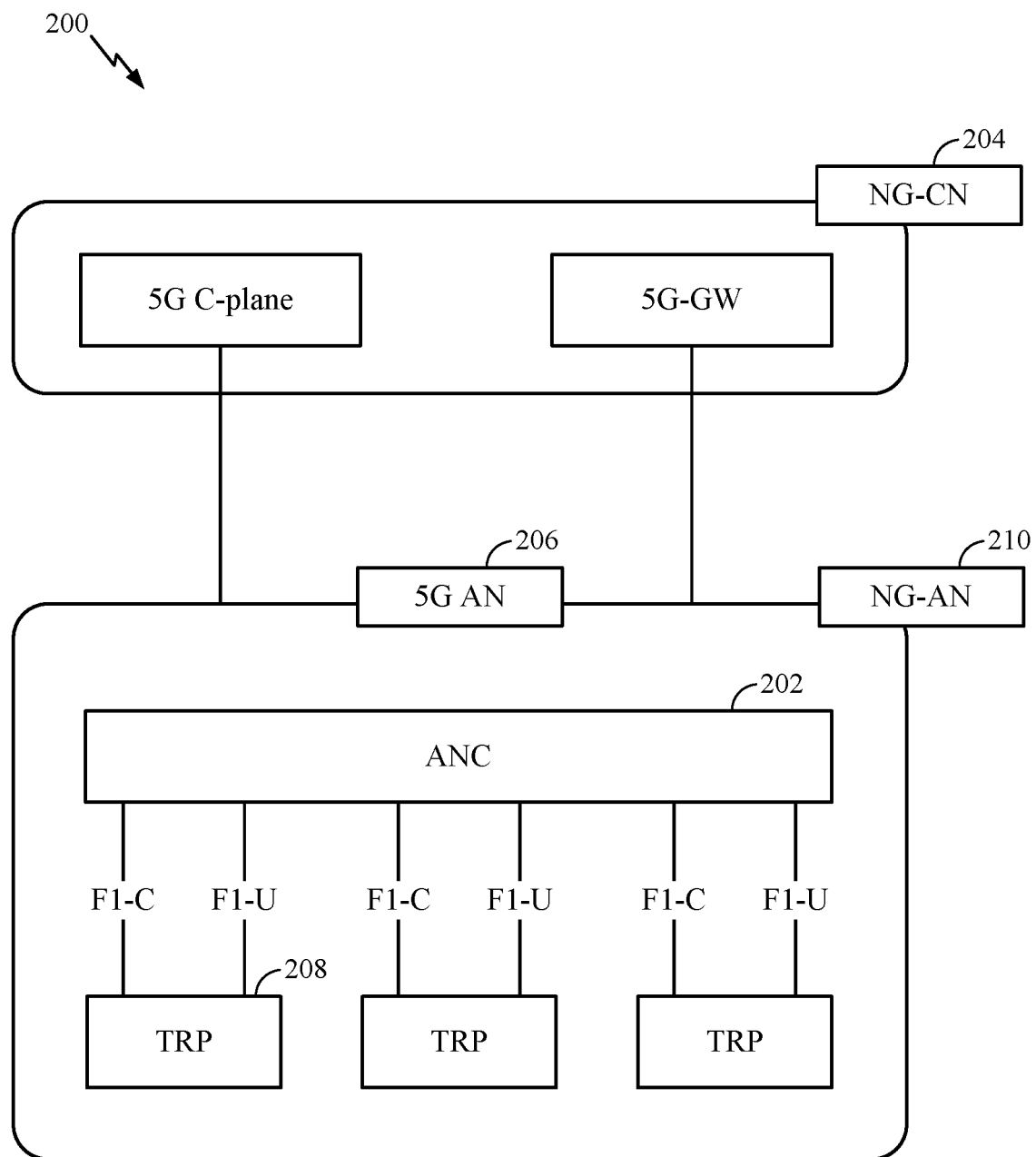
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
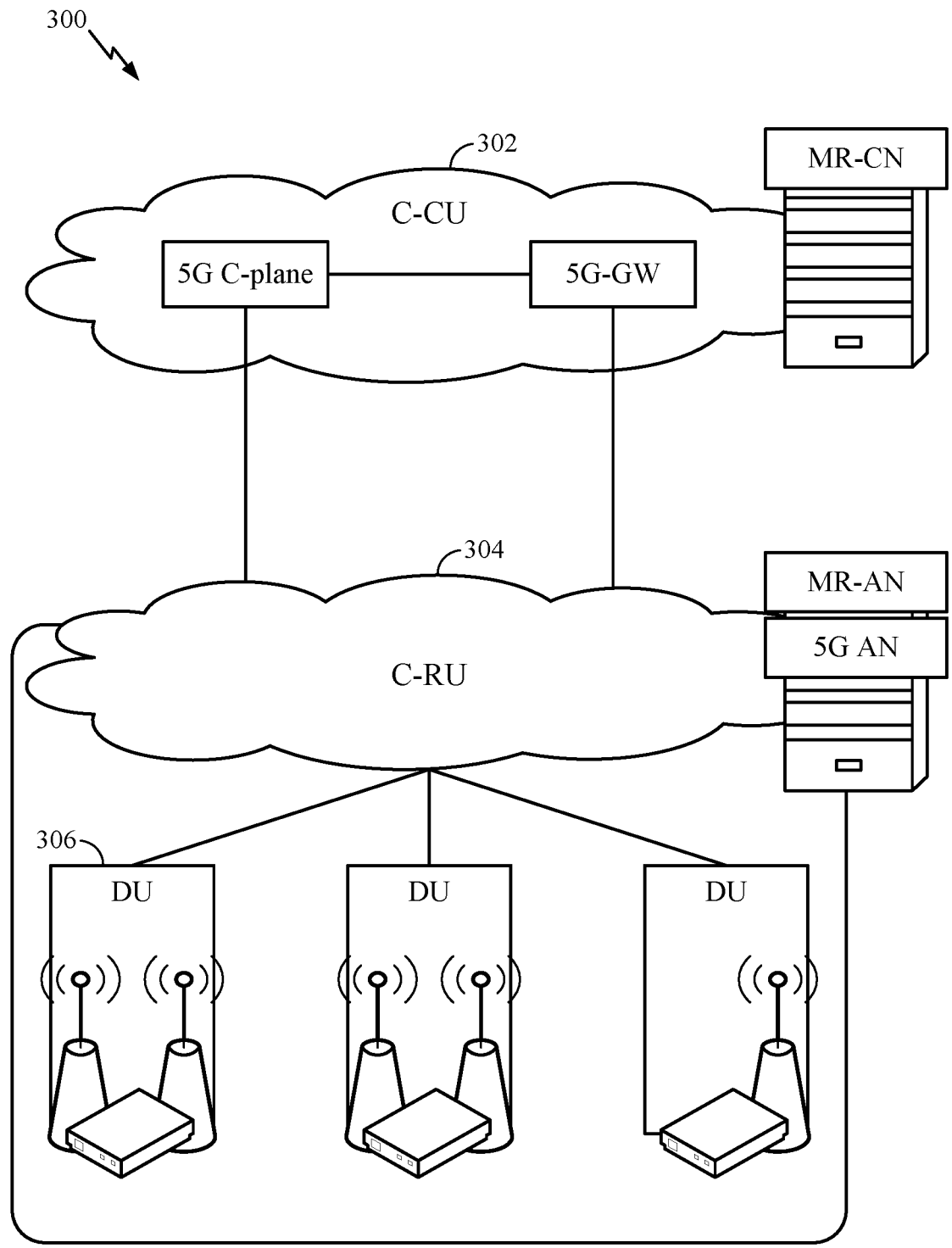
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
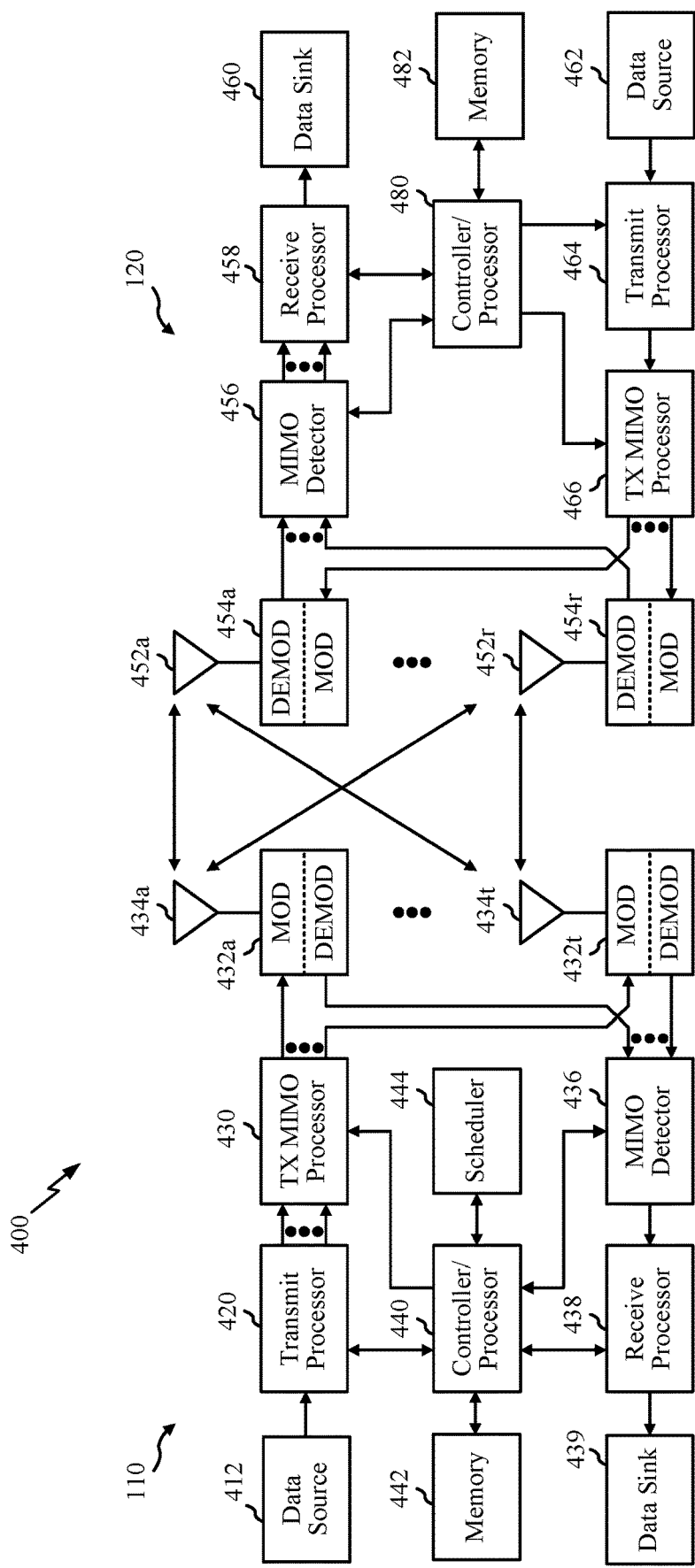
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 13-14.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

Figure 13:
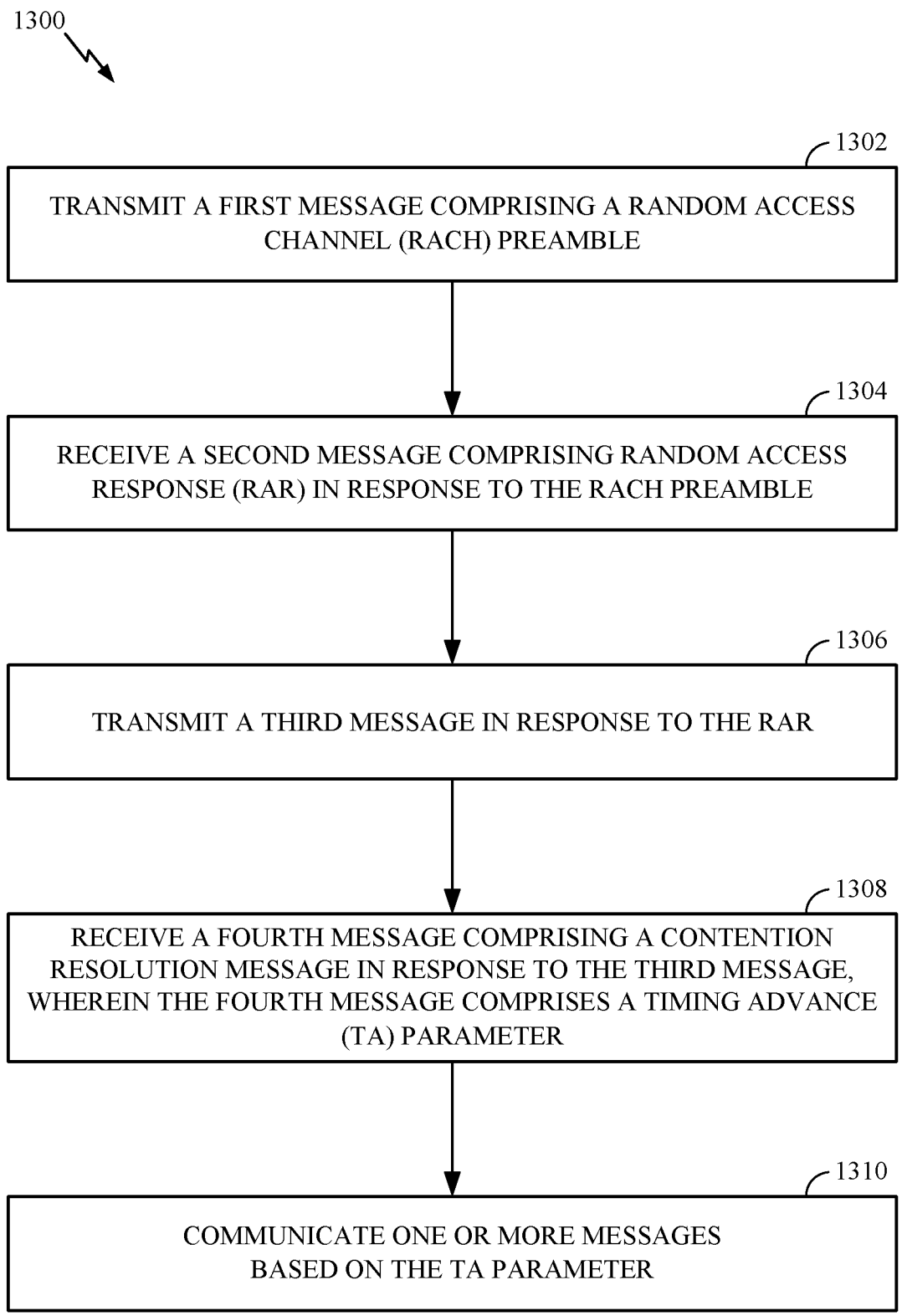
FIG. 13 illustrates example operations for wireless communication by a UE, in accordance with certain aspects of the present disclosure.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 14, and/or other processes for the techniques described herein. The processor 480 and/or other processors and modules at the UE 120 may also perform or direct, e.g., the execution of the corresponding/complementary processes for the techniques described herein and as illustrated in FIG. 13. The memories 442 and 482 may store data and program codes for the BS 110 and the UE 120, respectively. A scheduler 444 may schedule UEs for data transmission on the downlink and/or uplink.

Figure 5:
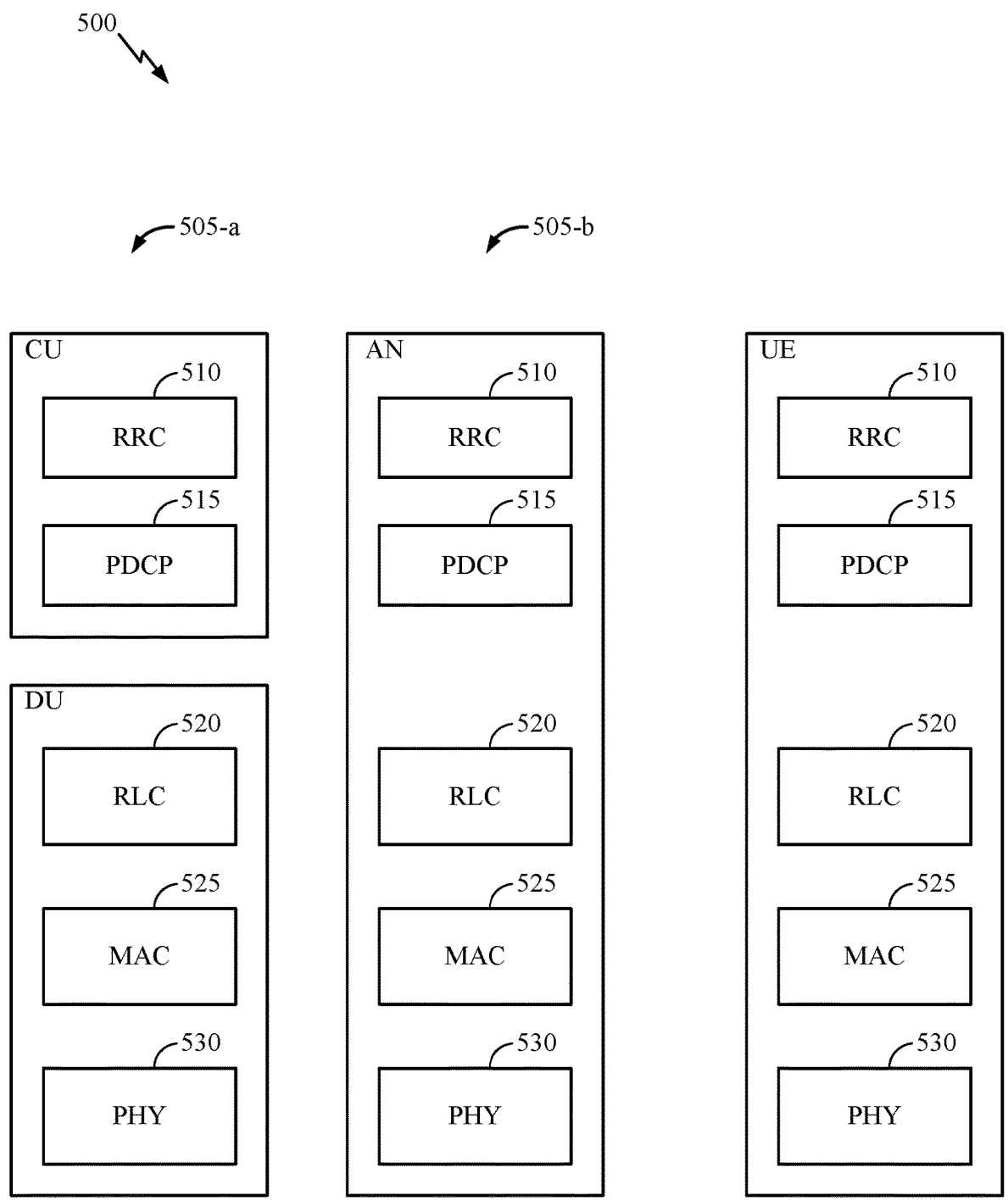
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
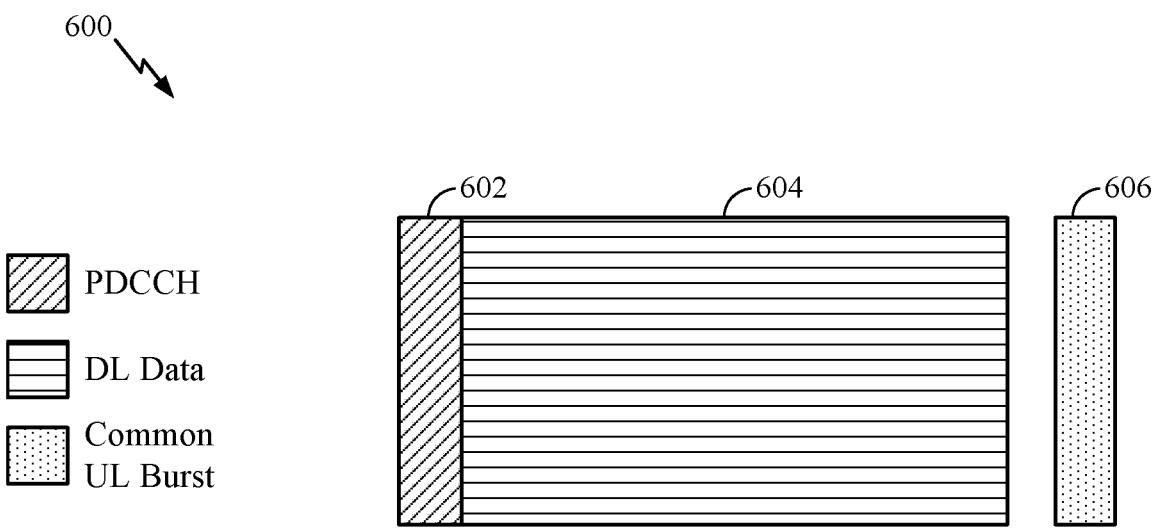
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an acknowledgement (ACK) signal, a negative acknowledgement (NACK) signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
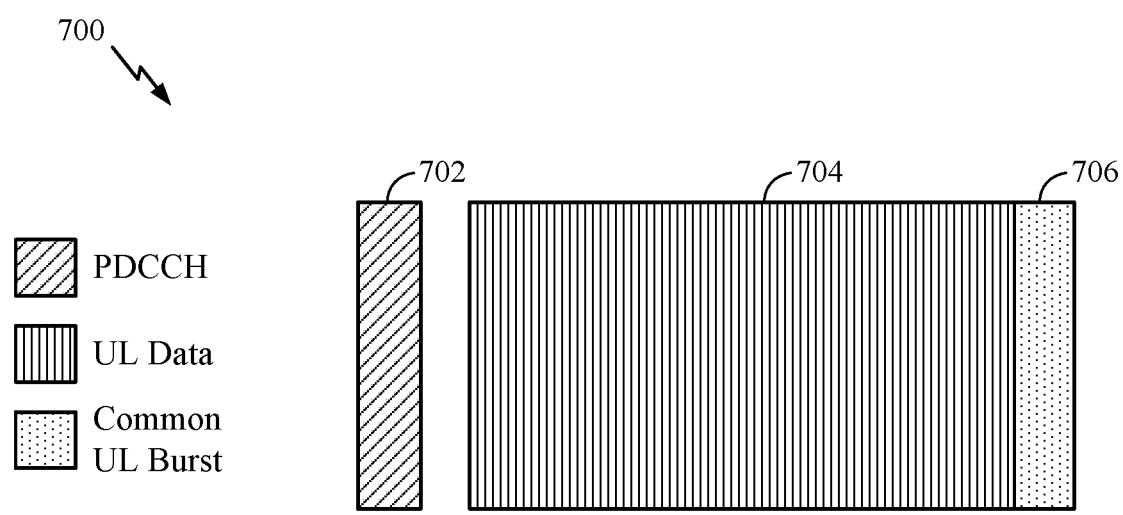
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Millimeter Wave (MMWAVE) Systems

As used herein, the term millimeter wave (mmWave) generally refers to spectrum bands in very high frequencies such as 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be used for spatial reuse. This is one of the key enablers for using mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, by using the beams for random access channel (RACH) communication.

Figure 8:
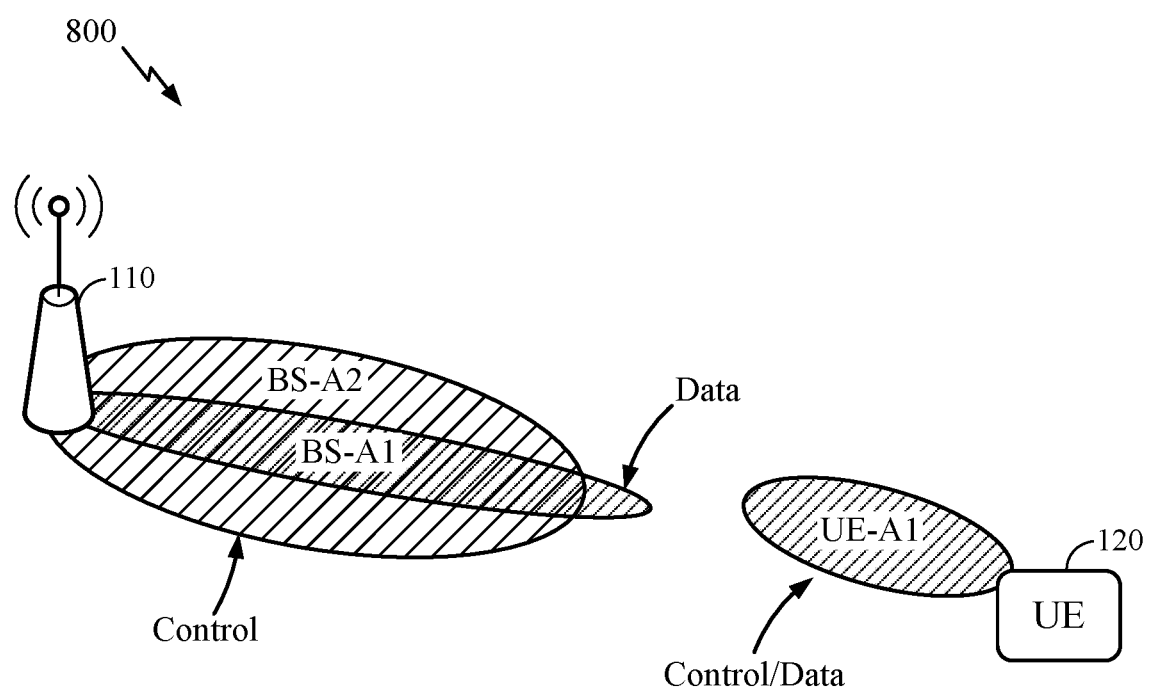
FIG. 8 illustrates an example of active beams, in accordance with certain aspects of the present disclosure.

FIG. 8 illustrates an example communication system 800 having active beams, in accordance with aspects of the present disclosure. A BS and a UE may communicate using a set of active beams. Active beams may refer to BS and UE beam pairs that are used to transmit data and control channels. A data beam may be used to transmit data and a control beam may be used to transmit control information. As illustrated in FIG. 8, data beam BS-A1 may be used to transmit DL data and control beam BS-A2 may be used to transmit DL control information.

A BS may monitor beams using beam measurements and feedback from a UE. For example, a BS may monitor active beams using DL reference signals. A BS may transmit a DL RS, such as a measurement reference signal (MRS), channel state information reference signal (CSI-RS), or a synchronization (synch) signal. A UE may report, to the BS, a reference signal receive power (RSRP) associated with a received reference signal. In this manner, the BS may monitor active beams.

Example Random Access Channel (RACH) Procedure

A random access channel (RACH) is a channel that may be shared by multiple UEs and may be used by the UEs to access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network. Certain aspects of the present disclosure provide multiple RACH procedures and techniques for selecting a RACH procedure for communication.

Figure 9:
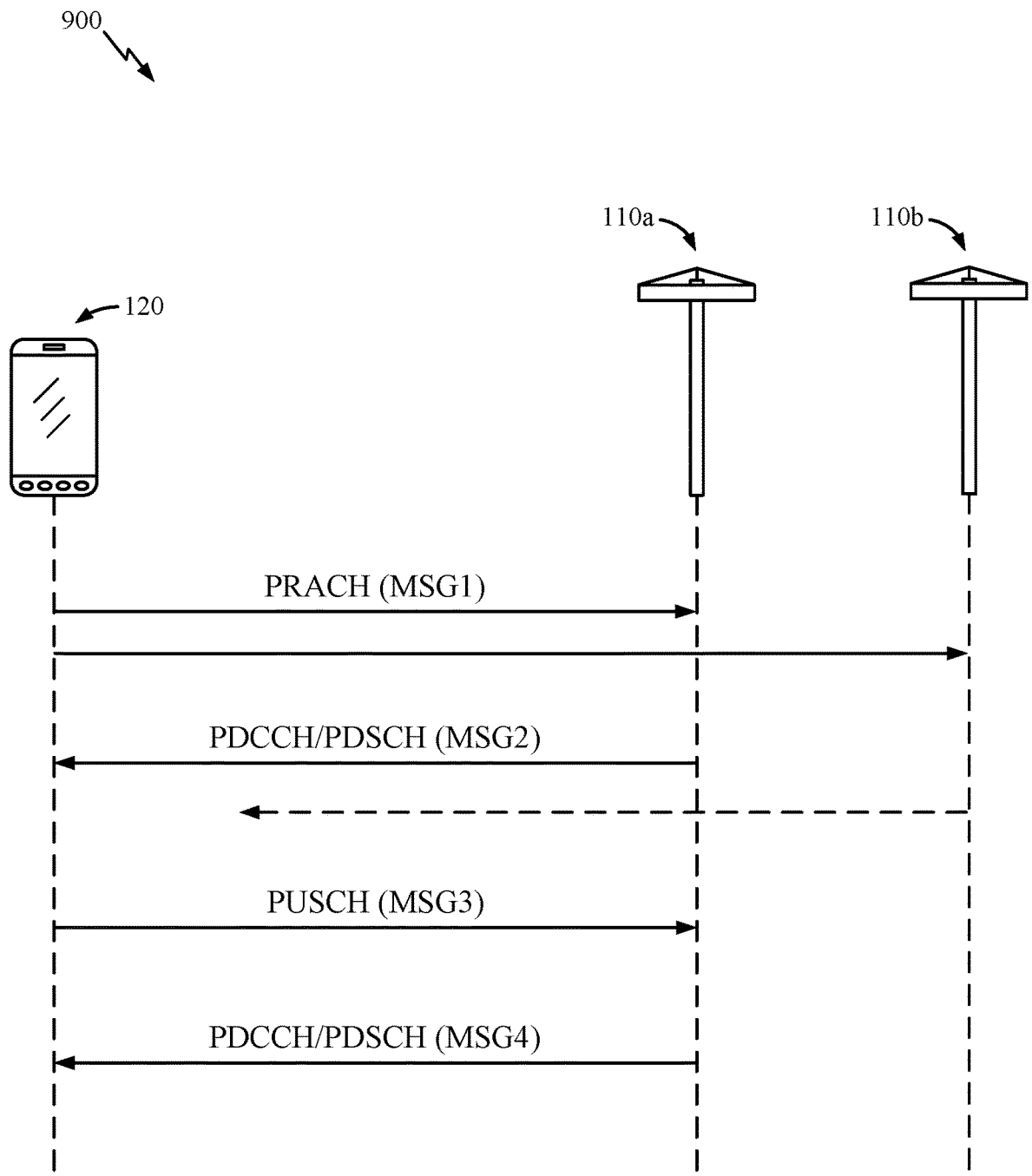
FIG. 9 a timing diagram illustrating an example four-step random access channel (RACH) procedure, in accordance with certain aspects of the present disclosure.

FIG. 9 is a timing diagram 900 illustrating an example four-step RACH procedure, in accordance with certain aspects of the present disclosure. A first message (MSG1) may be sent from the UE 120 to BS 110a (e.g., eNB) and BS 110b on the physical random access channel (PRACH). In this case, MSG1 may only include a RACH preamble. At least one of BS 110a or BS 110b may respond with a random access response (RAR) message (MSG2) which may include the identifier (ID) of the RACH preamble, a timing advance (TA), an uplink grant, cell radio network temporary identifier (C-RNTI), and a back off indicator. TA generally refers to an offset between the start of a received downlink subframe and a transmitted uplink subframe used to ensure that the downlink and uplink subframes are synchronized at the BS. In some cases, the TA may be estimated by the BS based on the PRACH (MSG1) sent by the UE to the BS. Certain aspects of the present disclosure provide techniques for refining the TA parameter, as will be described in more detail herein. MSG2 may include a PDCCH communication including control information for a following communication on the PDSCH, as illustrated. In response to MSG2, MSG3 is transmitted from the UE 120 to BS 110a on the PUSCH. MSG2 may include a RRC connection request, a tracking area update, and a scheduling request. The BS 110a then responds with MSG4 which may include a contention resolution message.

Figure 10:
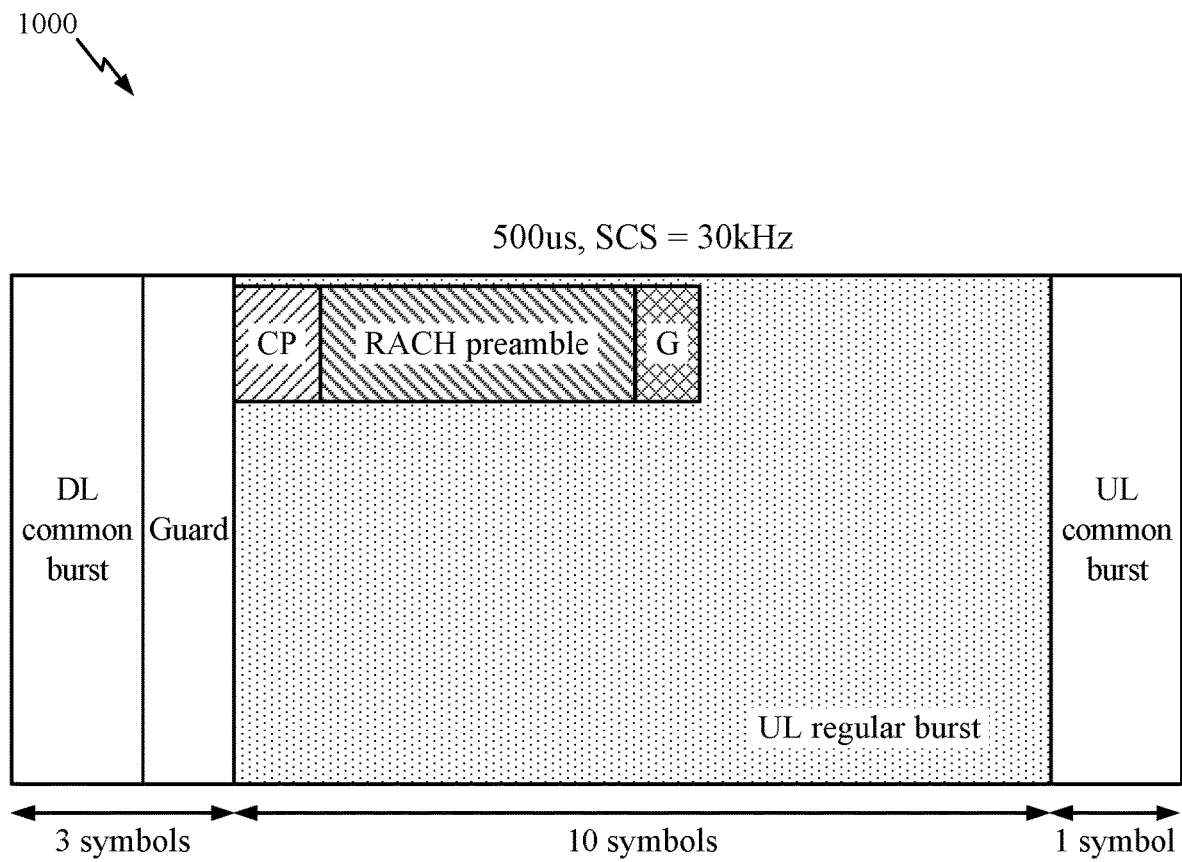
FIG. 10 is a diagram of an example uplink communication of a four-step RACH procedure, in accordance with certain aspects of the present disclosure.

FIG. 10 is a diagram of an example uplink communication 1000 of MSG1 for a four-step RACH procedure, in accordance with certain aspects of the present disclosure. The uplink communication 1000 begins with a DL common burst, and ends with an UL common burst, as illustrated. The PRACH is included as part of the regulator UL burst between the DL and UL common bursts and includes a cyclic prefix (CP).

In certain aspects, the RACH procedure messages may be used for NR. In certain aspects, the design of the random access procedure may take into account the possible use of single-beam and multiple beam operations, including non Rx/Tx reciprocity at BS or UE and full or partial Rx/Tx reciprocity at BS or UE. In certain aspects, when multiple beam-forming is applied to DL broadcast channels/signals for initial access, RACH resource(s) may be obtained by the UE from detected DL broadcast channels/signals. In addition, multiple occasions for RACH preamble transmission in a given time interval may be used. In certain aspects, RACH reception/RAR transmission occurs in TRPs/beams other than the one transmitting synchronization signals.

DL L1/L2 beam management procedures may also be supported within one or multiple TRPs. For example, a first procedure may be used to enable UE measurement on different TRP Tx beams to support selection of TRP Tx beams/UE Rx beam(s). Beamforming at TRP may include an intra/inter-TRP Tx beam sweep from a set of different beams. Beamforming at UE may include a UE Rx beam sweep from a set of different beams. TRP Tx beam and UE Rx beam can be determined jointly or sequentially.

A second procedure may be used to enable UE measurement on different TRP Tx beams to possibly change inter/intra-TRP Tx beam(s). The UE measurement may be from a possibly smaller set of beams for beam refinement in the first procedure. A third procedure may be used to enable UE measurement on the same TRP Tx beam to change UE Rx beam in the case UE uses beamforming.

In certain aspects, when Tx/Rx reciprocity is available at gNB, at least for multiple beams operation, certain RACH procedure may be used for at least UEs in idle mode. Association between one or multiple occasions for DL broadcast channel/signal and a subset of RACH resources may be informed to the UE by broadcast system information or known by the UE.

In some cases, based on the DL measurement and the corresponding association, the UE selects the subset of RACH resources. At gNB, the DL Tx beam for the UE can be obtained based on the detected RACH preamble and would be also applied to MSG2. In some cases, UL grant in MSG2 may indicate the transmission timing of MSG3.

For the cases with and without Tx/Rx reciprocity, the common random access procedure may be used. When Tx/Rx reciprocity is not available, in certain aspects, for at least UEs in idle mode, DL Tx beam to gNB (e.g., RACH preamble/resource, MSG 3) is reported, and UL Tx beam to the UE, (e.g., RAR) is indicated.

In certain aspects of the present disclosure, the four-step RACH procedure may be used when UE transitions from an RRC-Idle mode of operation to an RRC-connected active mode of operations. The modes of operation of the UE are described in more detail with respect to FIG. 11.

Figure 11:
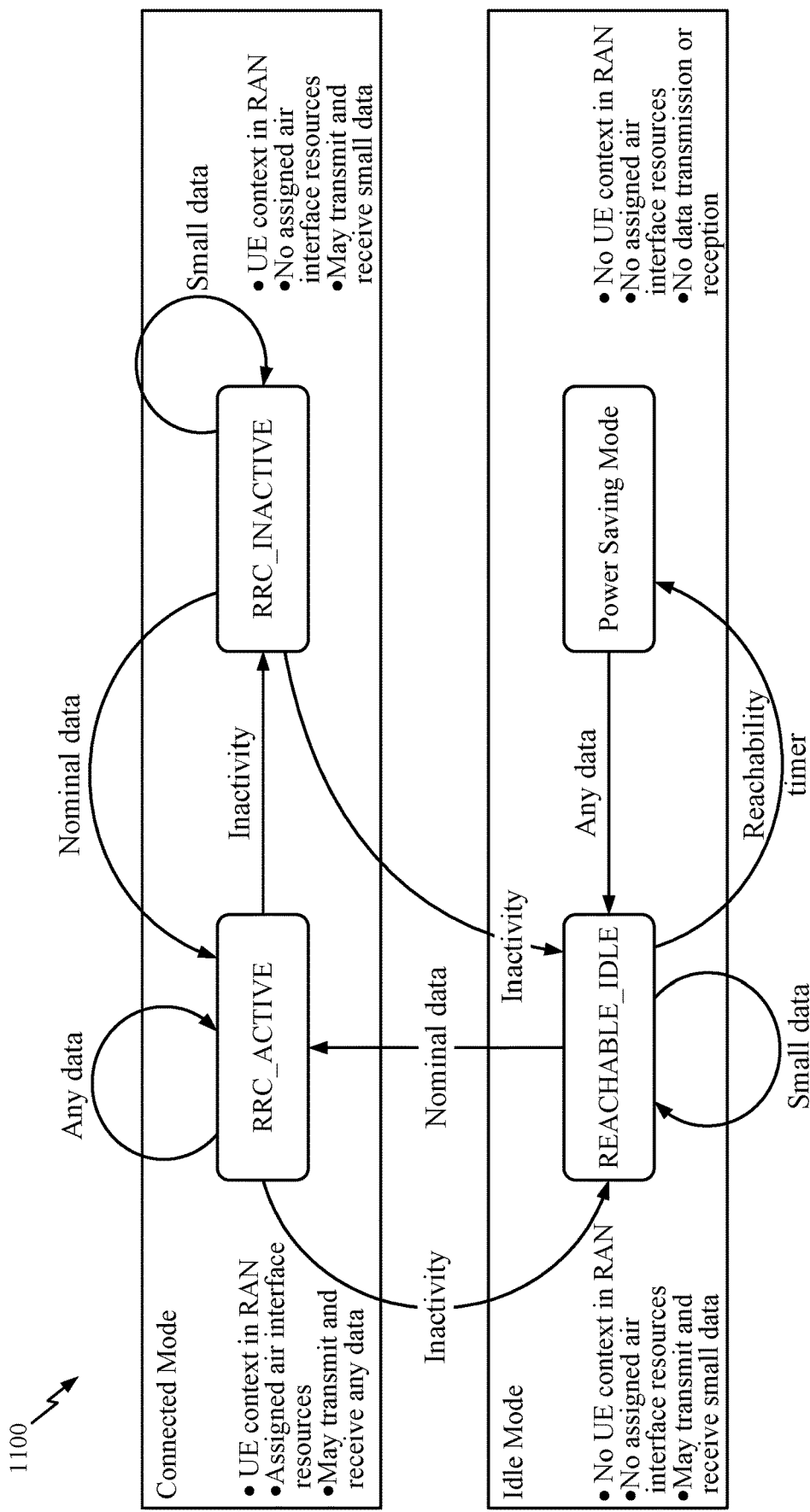
FIG. 11 is an example diagram illustrating different modes of operations of a user-equipment (UE), in accordance with certain aspects of the present disclosure.

FIG. 11 is an example diagram 1100 illustrating different modes of operations of a UE, in accordance with certain aspects of the present disclosure. As illustrated, a UE may be in either an RRC connected mode of operations or an idle mode of operation. In the RRC connected mode of operation, the UE may be either active (RRC_ACTIVE mode) or inactive (RRC_INACTIVE mode). In both the RRC_INACTIVE mode and the RRC_ACTIVE mode, there may be a UE context in the radio access network (RAN). In the RRC_INACTIVE mode, there may be no air interface resources assigned to the UE and the UE may be able to transmit and receive a small amount of data.

To transmit nominal data, the UE may switch to the RRC_ACTIVE mode in which there may be assigned air interface resources to the UE and the UE may be able to transmit and receive any data. Due to inactivity, the UE may enter the idle mode of operation, in which there may be a REACHABLE_IDLE mode and a power saving mode. In both the REACHABLE_IDLE mode and power saving mode, there may be no UE context in the RAN and no assigned air interface resources for the UE. In the REACHABLE_IDLE mode, the UE may be able to transmit and receive a small amount of data. In some cases, after a reachability timer has expired, the UE may enter the power saving mode, where the UE may be unable to transmit and receive data.

The UE modes of operation described with respect to FIG. 11 may be implemented for NR. NR may refer to radios configured to operate according to a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive machine type communication (mMTC) targeting non-backward compatible MTC techniques, and mission critical targeting ultra-reliable low latency communications (URLLC). An NR cell may refer to a cell operating according to the NR network. A NR eNB (e.g., BS 110) may correspond to one or multiple transmission reception points (TRPs).

Example Rach Procedure in MMWAVE (MMW)

Certain aspects of the present disclosure are generally directed to the selection of transmit or receive beams for communicating RACH messages. Different beams may be transmitted in different directions and may provide different signal qualities. In certain aspects, a UE may select the beam with the highest signal quality for communication of RACH messages.

Figure 12A:
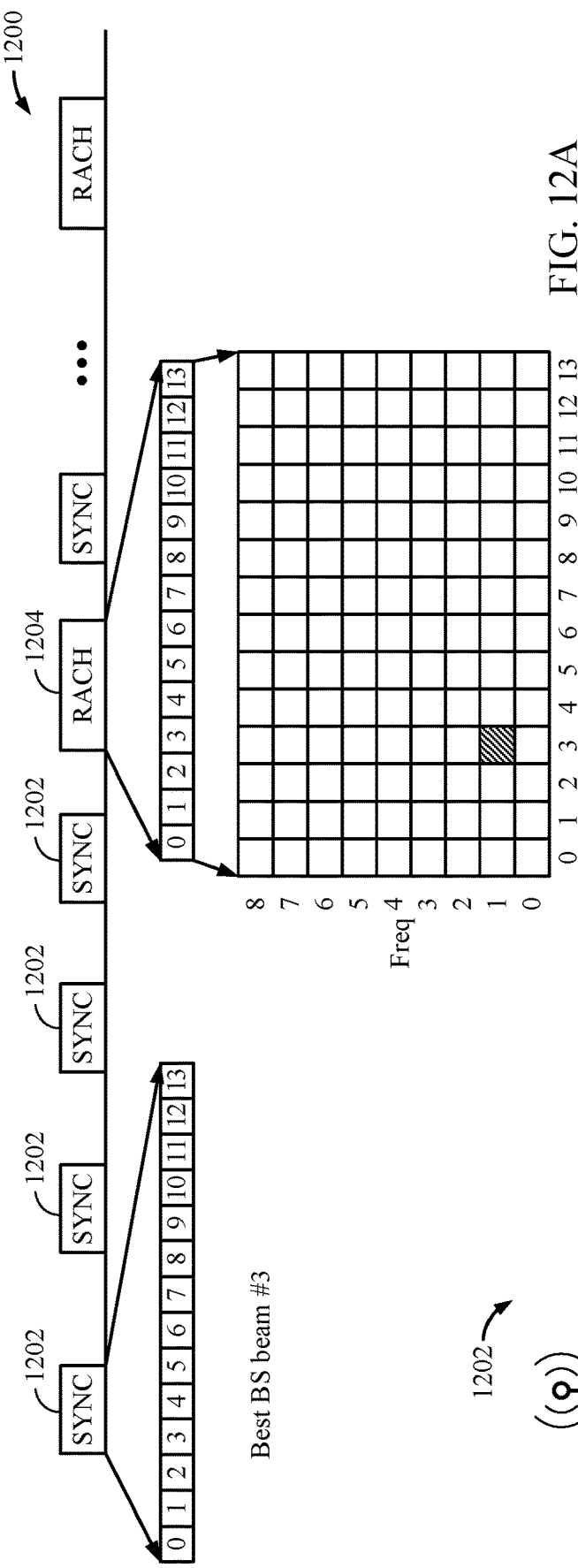
FIG. 12A is a diagram illustrating example synchronization (SYNC) and RACH message communication, in accordance with certain aspects of the present disclosure.

FIG. 12A is a diagram 1200 illustrating example synchronization (SYNC) and RACH message communication, in accordance with certain aspects of the present disclosure. For example, a BS may transmit one or more SYNC messages 1202 to a UE in order to synchronize communications. Each of the SYNC messages 1202 may include multiple symbols (e.g., 13 symbols as illustrated), and each of the symbols may be transmitted using a different beam (e.g., in different directions). The UE may receive the SYNC message and determine the beam (e.g., symbol) with the highest signal quality.

As illustrated, the RACH message 1204 transmitted by the UE may also include multiple symbols which may correspond to the symbols of the SYNC message. Based on the beam (e.g., symbol) of the SYNC message that was determined by the UE to have the highest quality, the UE may select the beam (e.g., symbol) for transmitting the RACH preamble (e.g., MSG 1 of the four-step RACH procedure illustrated in FIG. 9). For example, if beam 3 (e.g., symbol 3) of the SYNC message was selected to have the highest quality, beam 3 (e.g., symbol 3) of the RACH message may be used to transmit the RACH preamble. In some cases, the two beams (or symbols) having the highest quality may be selected by the UE and used for transmitting the RACH preamble and the RACH payload.

Figure 12B:
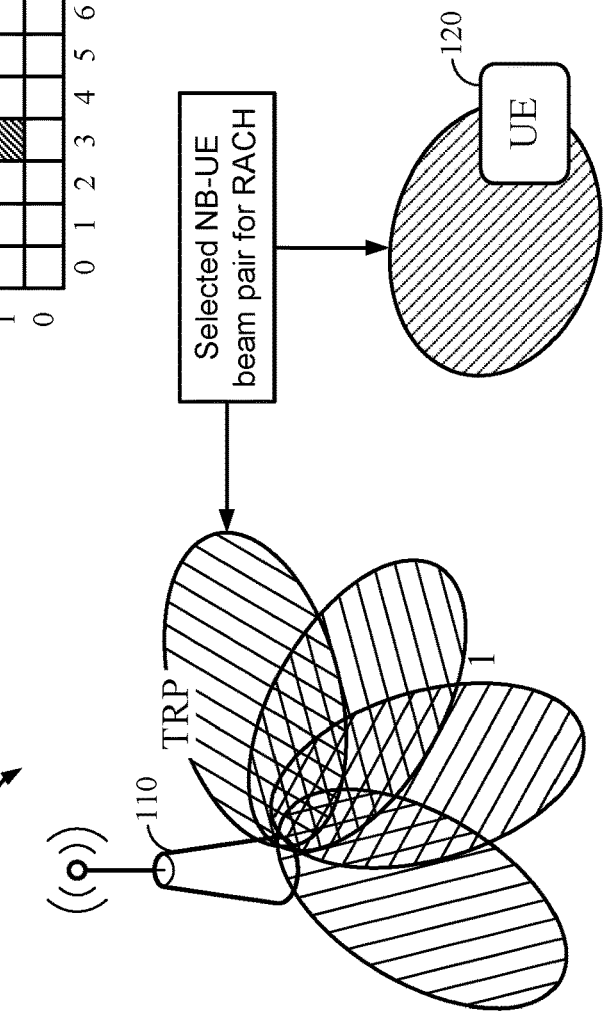
FIGS. 12B and 12C are diagrams illustrating beam refinement protocols, in accordance with certain aspects of the present disclosure.

FIG. 12B is a diagram illustrating selection of a BS (e.g., NB) and UE beams during initial acquisition, in accordance with certain aspects of the present disclosure. As presented above, random access procedure is used for several key functionalities e.g. initial system access, handovers and transition from idle to connected state. In NR, during initial system access, the UE 120 detects multiple beams from a BS 110 and decodes the broadcast channel. Following which, the UE 120 may use a beam direction for the RACH procedure, e.g., to exchange PRACH preamble, random access response (RAR), message 3 and message 4. However, the selected beams during initial access may not be best suited for the UE 120 to continue RACH procedure.

There are several issues with continuing RACH procedure over the BS-UE beam pair selected during initial access. For example, the BS and UE beams selected during the initial system acquisition may have lower beamforming gain. Thus, using such beam pair may impact RACH performances. Moreover, the UE may select a suitable BS-UE beam pair, which may not have the best beamforming gain for the RACH procedure and subsequent transmissions. Such a selection results in higher transmission power on the UL for the duration of the RACH procedure. This may cause excessive interference on the uplink. In some cases, the UE may be located at cross-over points of two BS beams and consequently neither of the beams may be best suited for the UE as they both may have lower beamforming gain.

Beam reciprocity can play an important role in multi-beam operation. If beam reciprocity holds, then the BS 110 and the UE 120 can use BS Tx beam and UE Rx beam identified during initial system acquisition for uplink transmissions (i.e., UE Tx beam and BS Rx beam). However, when partial or no beam reciprocity exists, then using the DL beams for UL transmission may impact RACH performances.

Certain aspects of the present disclosure provide techniques for overcoming these issues by refining selected beams during RACH procedure. Beam refinement may be performed using reference signal transmissions (e.g., on DL) and reporting for selecting a better BS-UE beam pair.

Figure 12C:
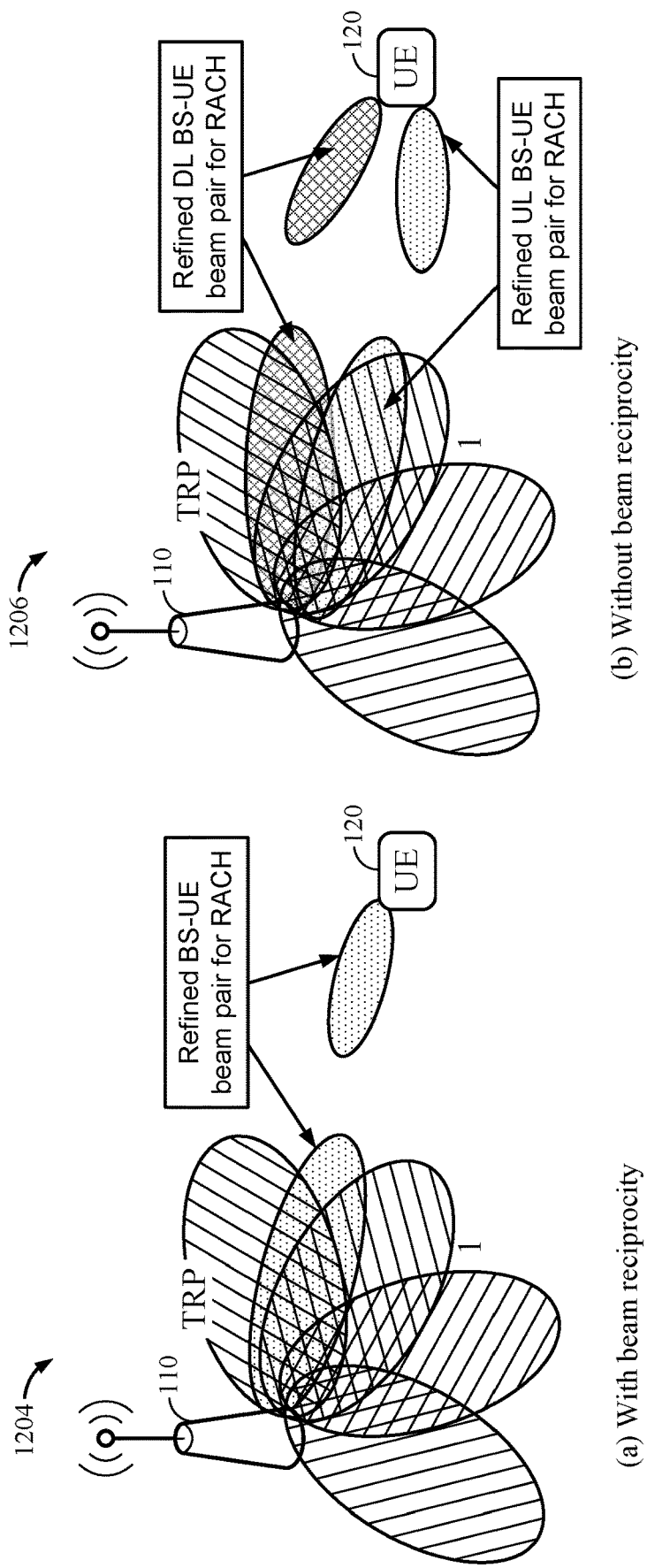

FIG. 12C illustrates diagrams 1204 and 1206 showing beam refinement at the BS and UE with and without beam reciprocity, in accordance with certain aspects of the present disclosure. The BS 110 and UE 120 can perform beam refinement during MSG3 of RACH procedure so that the BS 110 can refine the best UL TX and UL RX beams. If either the UE 120 and/or BS 110 does not have beam correspondence, this procedure allows the UE 120 and/or BS 110 to find the best UL TX and RX beam before starting data communications.

For example, the UE 120 can transmit reference signals (RSs) in different symbols of MSG3 with same or different UL TX beams. BS 110 can receive these RSs in different symbols of MSG3 with same or different UL RX beams. In MSG4, BS can inform the UE regarding the indices of the symbols of MSG3 where it received reference signals with good quality. Based on this indication, the UE can find the set of good UL TX beam indices for data communication. Here, quality may denote one or more combinations of link gain, signal-to-noise ratio (SNR), signal-to-interference-plus-noise ratio (SINR), reference signal received power (RSRP), received signal strength indicator (RSSI), reference signal received quality (RSRQ), channel quality indicator (CQI), or beam quality information.

Example Random Access Channel (RACH) Timing Adjustment

The subcarrier spacing allocated for RACH in millimeter wave (MMW) systems can be small to generate longer sequences and improve link budget. Hence, a narrow bandwidth for MSG1 can allow a sufficiently long preamble sequence, in the frequency domain, due to small subcarrier spacing. Besides, narrow bandwidth of MSG1 preamble allows multiple UEs to be frequency division multiplexed together during RACH communication and reduces the total amount of time reserved for RACH MSG1. However, fine time granularity is also important in MMW systems. MMW systems may implement analog beams which, depending on directionality of active users, may make frequency division multiplexing (FDM) more difficult to implement, but may make time divisional multiplexing (TDM) easier to implement.

In some cases, to FDM two UEs together, the UEs may have to be located in the same direction from the perspective of the eNB. However, in this case, TDM of the UEs may be easier as each UE may be designated different symbol(s). Since each UE may transmit wideband signals and occupy a few symbols, finer timing adjustment may be important. With finer timing adjustment, a scaled numerology and shorter cyclic prefix (CP) may be implemented. Certain aspects of the present disclosure provide techniques for obtaining fine correction of timing, allowing for the use of shorter CP in uplink (UL), while keeping bandwidth of RACH MSG1 small.

FIG. 13 illustrates example operations 1300 for wireless communication, in accordance with certain aspects of the present disclosure. In certain aspects, the operations 1300 may be performed by a UE such as the UE 120.

The operations 1300 may begin, at block 1302, by transmitting a first message (MSG1) comprising a RACH preamble, and at block 1304, receiving a second message (MSG2) comprising random access response (RAR) in response to the RACH preamble. At block 1306, the operations continue by transmitting a third message (MSG3) in response to the RAR. In certain aspects the MSG3 may comprise at least one of a radio resource control (RRC) connection request, a tracking area update or a scheduling request. The operations 1300 continue, at block 1308, by receiving a fourth message (MSG4) in response to the MSG3, wherein the MSG4 comprises a timing advance (TA) parameter. In some cases, the fourth message may include a contention resolution message. At block 1310, the eNB communicates one or more messages based on the TA parameter.

Figure 14:
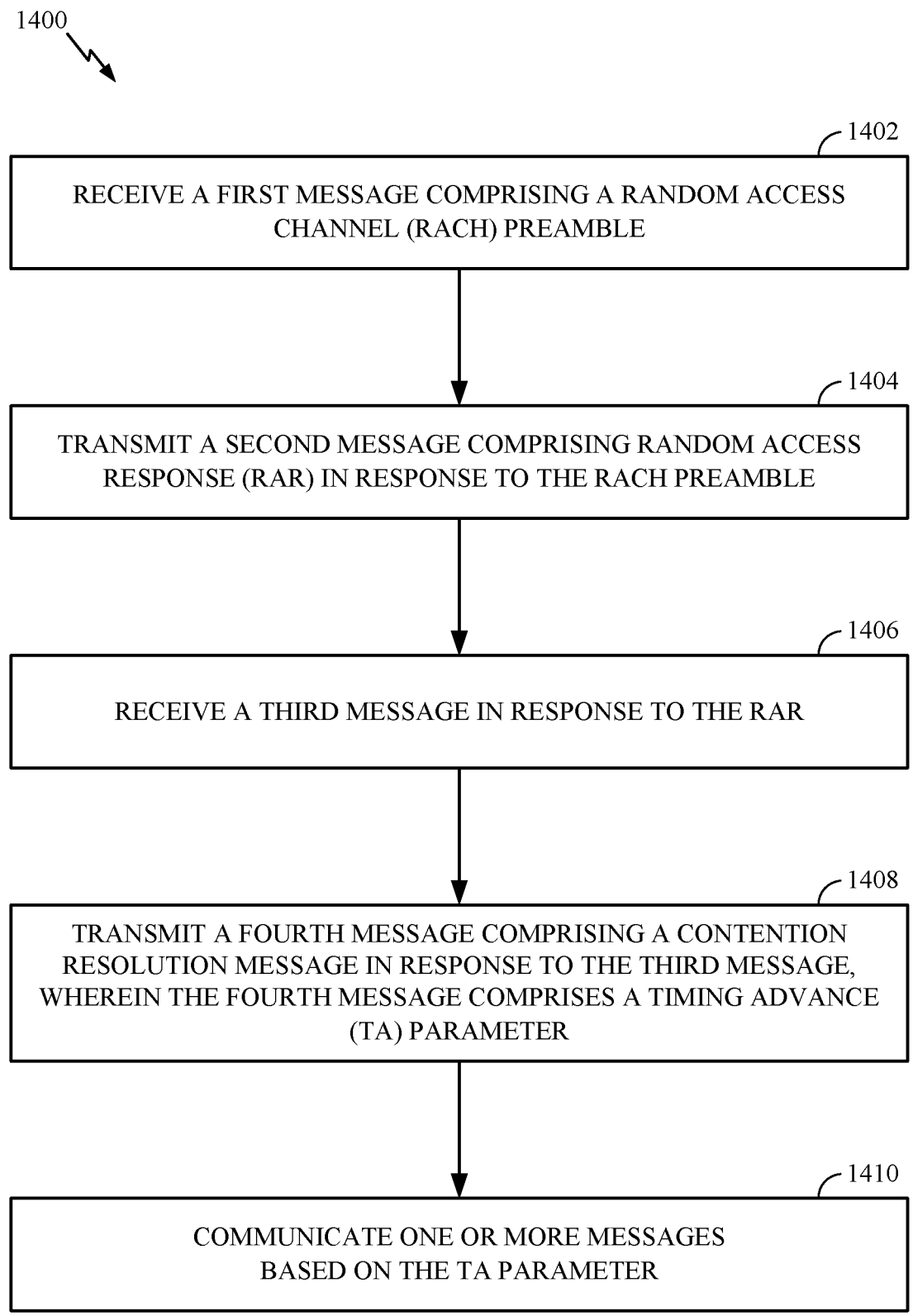
FIG. 14 illustrates example operations for wireless communication by a base station, in accordance with certain aspects of the present disclosure.

FIG. 14 illustrates example operations 1400 for wireless communication, in accordance with certain aspects of the present disclosure. In certain aspects, the operations 1400 may be performed by an BS such as the BS 110*a*.

The operations 1400 may begin, at block 1402, by receiving a first message (MSG1) comprising a RACH preamble, and at block 1404, transmitting a second message (MSG2) comprising random access response (RAR) in response to the RACH preamble. The operations 1400 continue at block 1406, by receiving a third message (MSG3) in response to the RAR. In certain aspects the MSG3 may comprise at least one of an RRC connection request, a tracking area update or a scheduling request. The operations 1400 continue, at block 1408, by transmitting a fourth message (MSG4) in response to the MSG3, wherein the MSG4 comprises a timing advance (TA) parameter. In some cases, the fourth message may include a contention resolution message. In certain aspects, at block 1410, the UE communicates one or more messages (e.g., data or control messages) based on the TA parameter.

In certain aspects, the third message transmitted to the BS may include at least one reference signal (RS) to be used by the BS to determine the TA parameter. In this case, a configuration of the RS may be identified by the UE by receiving an indication of the configuration from the BS or may be previously known by the UE (e.g., standardized). The configuration of the RS may denote at least one of time-frequency resources, or interleaving patterns across different port of the RS. For example, the indication of the configuration may be received by the UE via at least one of a master information block (MIB) message, remaining system information (RMSI) message, a control channel, or a handover message.

In certain aspects, the UE may receive a plurality of reference signals that are transmitted from the BS using different transmit beams. The reference signals may be used to determine a transmit beam for transmitting MSG3. For example, the UE may select at least one of the transmit beams based on a parameter of each of the plurality of reference signals and transmit MSG3 using the selected transmit beam(s). In this case, the reference signals may include at least one of synchronization signals, CSI-RS signals or mobility reference signals. The synchronization signals may be at least one of primary synchronization signals (PSS), secondary synchronization signals (SSS), physical broadcast channel (PBCH) signals, or demodulation reference signals (DMRSs) of the PBCH.

Figure 15:
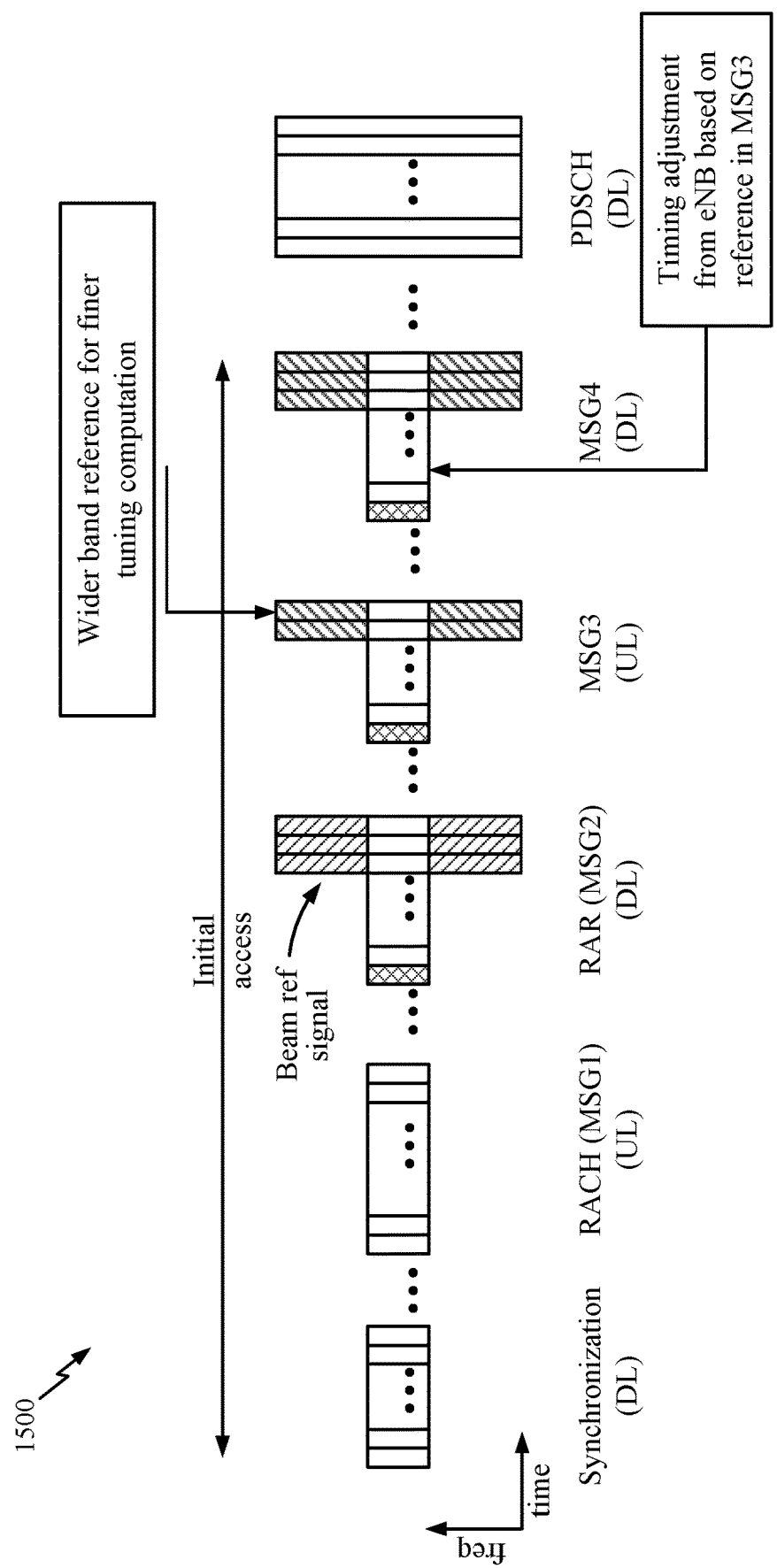
FIG. 15 illustrates an example RACH communication, in accordance with certain aspects of the present disclosure.

FIG. 15 illustrates an example RACH communication protocol 1500, in accordance with certain aspects of the present disclosure. As illustrated, a wider band reference signal in MSG3 can be used and may be transmitted using the same transmit beam selected for transmitting MSG1, as described with respect to FIG. 12. In certain aspects, MSG2 is transmitted by the BS using the wide bandwidth. The TX and RX used to determine the TA parameter by the BS may be the same or close to the same as the beam used for communication the one or more messages at block 1410 of FIG. 14. In certain aspects, MSG3 transmitted by the UE may include a reference signal (RS) and the TA parameter may be determined by the BS based on the RS.

As presented above with respect to FIG. 9, the MSG2 includes another TA parameter. In this case, the TA parameter of MSG4 and the TA parameter of MSG2 may both be used for timing adjustment. For example, with a 1 km cell radius and roughly 300 ns delay spread, the 1 km cell may lead to roughly 6.67 µs round trip time. Thus, the timing offset of MSG1 of a UE can be randomly distributed in a range of 7 µs depending on its location in the cell. Moreover, when the bandwidth of MSG1 is 5 MHz, the timing error at the BS after MSG1 reception can be up to ⅕ MHz which equals 200 ns. Therefore, the BS can split the range of timing error into 35 regions. After decoding MSG1, the BS can send the TA parameter to the UE using six bits where the error might be randomly distributed from −100 ns to +100 ns.

In certain aspects of the present disclosure, the UE can transmit a wideband (e.g. 20 MHz) signal in MSG3. The timing error after MSG3 reception may range from −25 to +25 ns. The BS may indicate the timing error to the UE by using, e.g., two bits in MSG4. For example, this may be because there are four possible regions of 50 ns timing error in a 200 ns timing window, which was the initial error before MSG4 transmission. The UE may use the TA of MSG4 along with the TA in MSG2.

In certain aspects, the RS in MSG3 is transmitted using a wide bandwidth with respect to a bandwidth used to transmit MSG1, as illustrated in FIG. 15. In certain aspects, MSG2 can indicate the bandwidth of the reference signal used in MSG3. Transmitting the RS using the wide bandwidth allows the eNB to more accurately measure the timing adjustment for the TA parameter. In certain aspects, the wide bandwidth used to transmit the RS may be determined based on at least one of a length of cyclic prefix or a numerology used to transmit the messages.

In certain aspects of the present disclosure, MSG3 may include a plurality of RSs that are transmitted using a plurality of transmit beams. In this case, the TA parameter may be determined by the BS for the plurality of transmit beams. In some cases, the RSs may be used for uplink beam refinement as described with respect to FIG. 12C. For example, MSG1 may establish a broad beam pair between the BS and the UE as described above with respect to FIG. 12A. In MSG3, the UE can transmit multiple wideband RSs using different narrow UL transmit beams that are neighbors to the broad UL transmit beam selected for MSG1. Moreover, the BS can receive these wideband RSs using different narrowband UL receive beams that are neighbors to the broad UL receiver beam selected during MSG1. The refined beam pair could be used to communicate MSG4 and subsequent data and control messages.

In certain aspects, MSG3 may include a sounding reference signal (SRS). In this case, the TA parameter may be determined by an BS based on the SRS. In some cases, the SRS may transmitted on a periodic basis and used to perform timing adjustment. The UE may receive a plurality of synchronization (SYNC) signals that are transmitted from a BS using different transmit beams, as described with respect to FIG. 12. The UE may select at least one of the transmit beams based on a parameter of each of the plurality of SYNC signals and MSG3 may be transmitted using the selected transmit beam.

The narrowband MSG1 preamble sequence, as illustrated in FIG. 15, allows FDM of multiple UEs during RACH MSG1 transmission. In some cases, different cyclic shifts and roots of sequences (e.g. Zadoff-Chu (ZC) sequence) may be used to provide UE separation during RACH MSG1 transmission. Certain aspects of the present disclosure use cyclic shift and different roots of sequences (e.g., ZC sequences), and in some cases, different subcarrier regions to provide UE separation. However, using FDM may provide better separation of UEs to avoid collision than using different roots for sequences.

Figure 16:
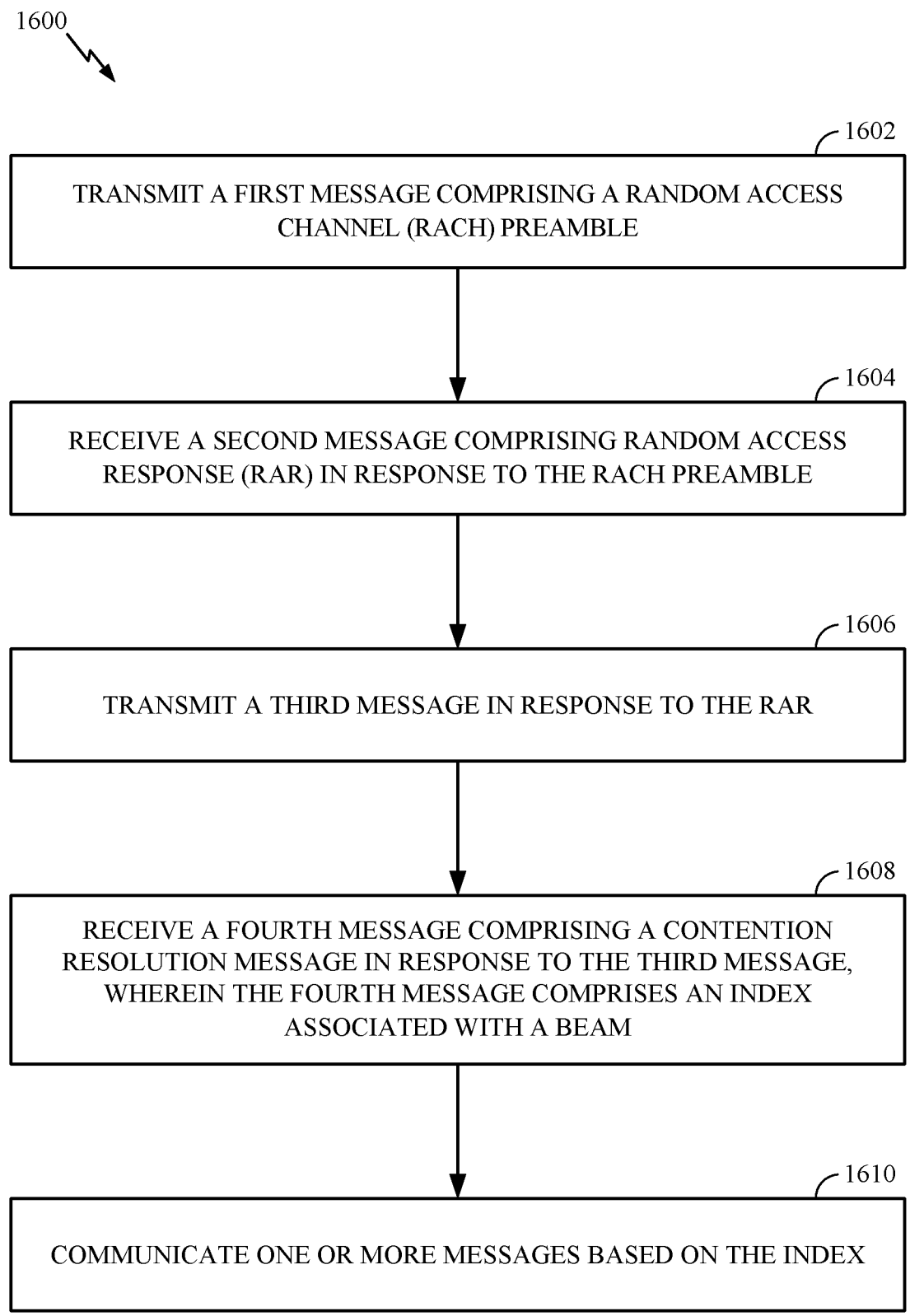
FIG. 16 illustrates example operations by a UE for selecting a beam for wireless communication, in accordance with certain aspects of the present disclosure.

FIG. 16 illustrates example operations 1600 for wireless communication, in accordance with certain aspects of the present disclosure. In certain aspects, the operations 1600 may be performed by a UE such as the UE 120.

The operations 1600 may begin, at block 1602, by transmitting a first message (MSG1) comprising a RACH preamble, and at block 1604, receiving a second message (MSG2) comprising a RAR in response to the RACH preamble. The operations 1600 continue at block 1606, by transmitting a third message (MSG3) in response to the RAR. In certain aspects, MSG3 may comprise at least one of an RRC connection request, a tracking area update or a scheduling request. The operations 1600 continue, at block 1608, by receiving a fourth message (MSG4) comprising a contention resolution message in response to MSG3, and MSG4 may include an index associated with a beam. In certain aspects, at block 1610, the UE communicates one or more messages (e.g., data or control messages) based on the index.

In certain aspects, MSG3 may include a plurality of RSs, and the index included in MSG4 may be determined by the BS based on the RSs. In some case, MSG2 may also include an index associated with a beam. In this case, and the index in MSG4 may be used to refine the beam selected based on the index in MSG2. For example, the UE may receive the index associated with a beam in MSG2, and further refine this beam using the index in MSG4 to determine a beam for communicating the one or more messages at block 1610. For example, the selected beam may correspond to the refined uplink BS-UE beam pair used for uplink transmissions as described with respect to FIG. 12C.

In certain aspects, the index in MSG4 may correspond to a symbol of MSG3 received at the BS with the highest signal strength. For example, the signal strength may be measured in terms of at least one of a CQI, a SINR, a SNR, a RSRP, a RSRQ, a RSSI, or beam state information.

Figure 17:
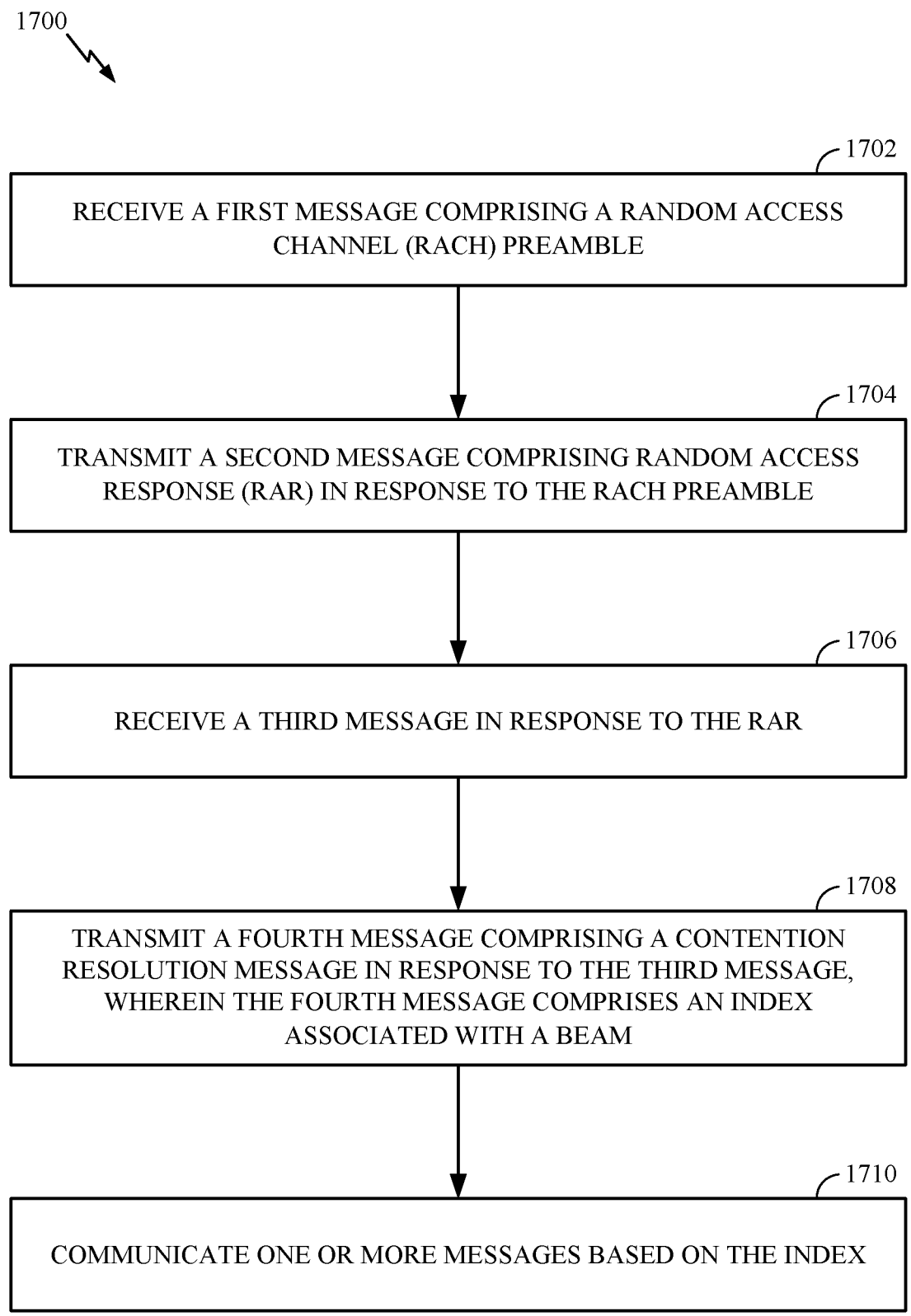
FIG. 17 illustrates example operations for wireless communication by a base station for selecting a beam for wireless communication, in accordance with certain aspects of the present disclosure.

FIG. 17 illustrates example operations 1700 for wireless communication, in accordance with certain aspects of the present disclosure. In certain aspects, the operations 1700 may be performed by a BS such as the BS 110.

The operations 1700 may begin, at block 1702, by receiving a first message (MSG1) comprising a RACH preamble, and at block 1704, transmitting a second message (MSG2) comprising RAR in response to the RACH preamble. The operations 1700 continue at block 1706 by receiving a third message (MSG3) in response to the RAR. In certain aspects the MSG3 may comprise at least one of an RRC connection request, a tracking area update or a scheduling request. The operations 1700 continue, at block 1708, by transmitting a fourth message (MSG4) comprising a contention resolution message in response to the MSG3. In some cases, MSG4 may include an index associated with a beam. In certain aspects, at block 1710, the UE communicates one or more messages (e.g., data or control messages) based on the index.

In certain aspects, MSG3 may include a plurality of RSs. In this case, the operations 1700 also include determining the index based on the RSs. In certain aspects, the operations 1700 also include selecting a beam and include an index associated with the beam in MSG2. The index in MSG4 may be used by the UE to refine a beam selected by the UE based on the index in MSG2, as described above.

In certain aspects, the operations 1700 also include selecting a symbol of MSG3 received with the highest signal strength, where the index in MSG4 corresponds to the symbol. In this case, the operations 1700 also include measuring the signal strength based on at least one of a CQI, a SINR, a SNR, a RSRP, a RSRQ, a RSSI, or beam state information.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising: transmitting a first message of a random access channel (RACH) procedure, the first message comprising a RACH preamble; receiving a second message of the RACH procedure, the second message comprising random access response (RAR) in response to the RACH preamble; transmitting a third message of the RACH procedure in response to the RAR, wherein the third message is transmitted to a base station (BS) and comprises at least one reference signal (RS) to be used by the BS to determine at least one timing advance (TA) parameter, wherein the at least one RS comprises a plurality of reference signals that are transmitted using a plurality of transmit beams; receiving a fourth message of the RACH procedure in response to the third message, wherein the fourth message comprises a plurality of TA parameters each determined for one of the plurality of transmit beams, wherein the plurality of TA parameters are included in the same fourth message; and communicating one or more messages based on at least one of the plurality of TA parameters.

2. The method of claim 1, wherein the second message comprises another TA parameter, wherein timing adjustment for communicating the one or more messages is based on at least one of the plurality of TA parameters and the other TA parameter.

3. The method of claim 1, wherein the at least one RS is transmitted using a wide bandwidth having a wider bandwidth with respect to a bandwidth used to transmit the first message.

4. The method of claim 3, further comprising receiving an indication of the wide bandwidth in the second message.

5. The method of claim 1, further comprising identifying a configuration of the at least one RS by receiving an indication of the configuration from the BS.

6. The method of claim 1, wherein:
the plurality of RSs are used to refine a transmit beam selected for transmitting the first message.

7. The method of claim 1, further comprising:
receiving a plurality of reference signals that are transmitted from the BS using different transmit beams; and
selecting at least one of the transmit beams based on a parameter of each of the plurality of reference signals, wherein the third message is transmitted using the at least one of the transmit beams.

8. A method for wireless communication, comprising:
receiving a first message of a random access channel (RACH) procedure, the first message comprising a RACH preamble;
transmitting a second message of the RACH procedure, the second message comprising random access response (RAR) in response to the RACH preamble;
receiving a third message of the RACH procedure in response to the RAR, wherein the third message comprises a plurality of reference signals (RSs) that are received using a plurality of receive beams;
determining a plurality of timing advance (TA) parameters, each of the plurality of TA parameters determined for one of the plurality of receive beams;
transmitting a fourth message of the RACH procedure in response to the third message, wherein the fourth message comprises the plurality of TA parameters, wherein the plurality of TA parameters are included in the same fourth message; and
communicating one or more messages based on at least one of the plurality of TA parameters.

9. The method of claim 8, further comprising:
determining another TA parameter based on the first message, wherein timing adjustment for communicating the one or more messages is based on the plurality of TA parameters and the other TA parameter.

10. The method of claim 8, wherein the plurality of RSs are received using a wide bandwidth having a wider bandwidth with respect to a bandwidth used to receive the first message.

11. The method of claim 10, further comprising determining the wide bandwidth based on a length of cyclic prefix or a numerology used to transmit at least one of a data message or a control message, wherein the second message comprises an indication of the wide bandwidth.

12. The method of claim 8, further comprising transmitting an indication of a configuration of the plurality of RSs.

13. The method of claim 8, further comprising performing uplink beam refinement based on at least one RS of the plurality of RSs.

14. The method of claim 13, wherein:
the plurality of RSs are used to refine a receiver beam selected for receiving the first message.

15. The method of claim 13, further comprising:
determining one or more indices corresponding to one or more symbols of the third message, each of the one or more symbols corresponding to a RS of the plurality of RSs; and
transmitting an indication of the one or more indices.

16. The method of claim 15, wherein the one or more indices correspond to one or more of the plurality of RSs received with a highest quality as determined based on one or more parameters.

17. A method for wireless communication, comprising:
transmitting a first message of a random access channel (RACH) procedure, the first message comprising a RACH preamble;
receiving a second message of the RACH procedure, the second message comprising random access response (RAR) in response to the RACH preamble;
transmitting a third message of the RACH procedure in response to the RAR, wherein the third message comprises a plurality of reference signals that are transmitted using a plurality of transmit beams;
receiving a fourth message of the RACH procedure in response to the third message, wherein the fourth message comprises an index associated with a beam, wherein the fourth message comprises a plurality of TA parameters each determined for one of the plurality of transmit beams, wherein the plurality of TA parameters are included in the same fourth message; and
communicating one or more messages based on the index.

18. The method of claim 17, wherein each of the plurality of RSs is used by a BS to determine the index.

19. The method of claim 18, wherein the second message comprises another index associated with a beam, and wherein the index in the fourth message is used to refine the beam selected based on the other index.

20. The method of claim 17, wherein the index in the fourth message corresponds to a symbol of one of the plurality of RSs received at a BS with the highest signal strength.

21. A method for wireless communication, comprising:
receiving a first message of a random access channel (RACH) procedure, the first message comprising a RACH preamble;
transmitting a second message of the RACH procedure, the second message comprising random access response (RAR) in response to the RACH preamble;
receiving a third message of the RACH procedure in response to the RAR, wherein the third message comprises a plurality of reference signals that are received using a plurality of receive beams;
transmitting a fourth message of the RACH procedure in response to the third message, wherein the fourth message comprises an index associated with a beam, wherein the fourth message comprises a plurality of TA parameters each determined for one of the plurality of receive beams, wherein the plurality of TA parameters are included in the same fourth message; and
communicating one or more messages based on the index.

22. The method of claim 21, further comprising determining the index based on the plurality of RSs.

23. The method of claim 22, further comprising selecting another beam, wherein the second message comprises another index associated with the other beam, and wherein the index is used by a user equipment (UE) to refine the other beam.

24. The method of claim 21, further comprising selecting a symbol of one of the plurality of RSs received with the highest signal strength, wherein the index in the fourth message corresponds to the symbol.

* * * * *